(No Model.)

H. J. BREWER.
GALVANIC BATTERY.

No. 373,435. Patented Nov. 22, 1887.

WITNESSES:
Chas. Nida
C. Sedgwick

INVENTOR:
H. J. Brewer
BY Munn & Co.
ATTORNEYS.

UNITED STATES PATENT OFFICE.

HORATIO J. BREWER, OF NEW YORK, N. Y.

GALVANIC BATTERY.

SPECIFICATION forming part of Letters Patent No. 373,435, dated November 22, 1887.

Application filed February 19, 1887. Serial No. 228,205. (No model.)

*To all whom it may concern:*

Be it known that I, HORATIO J. BREWER, of the city, county, and State of New York, have invented a new and Improved Galvanic Battery, of which the following is a full, clear, and exact description.

The object of my invention is to provide a new and improved galvanic battery which is simple and durable in construction, effective in operation, and not liable to be damaged.

The invention consists in the construction and arrangement of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
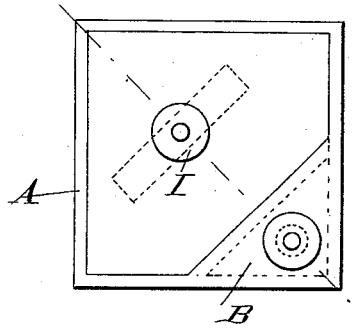
Figure 2:
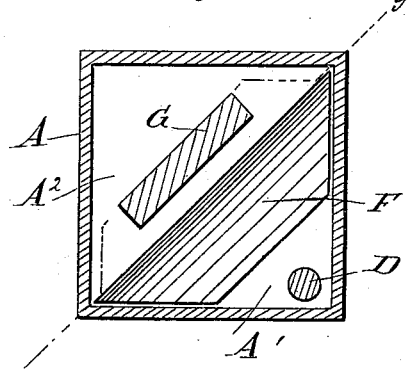
Figure 3:
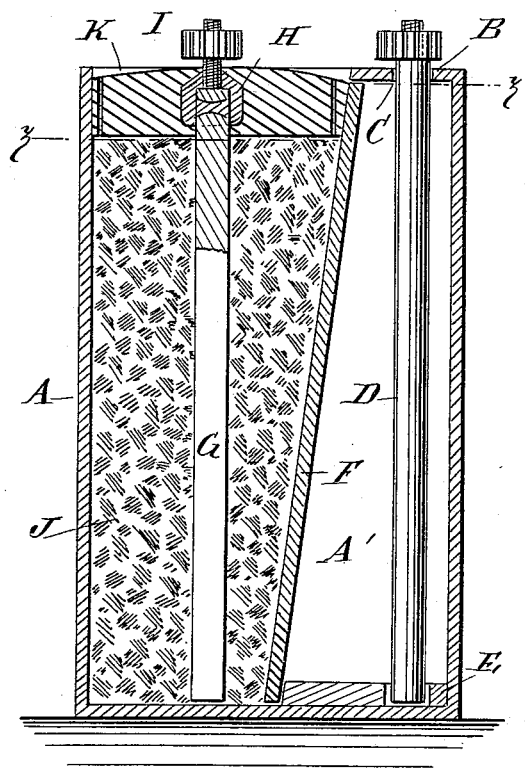
Figure 4:
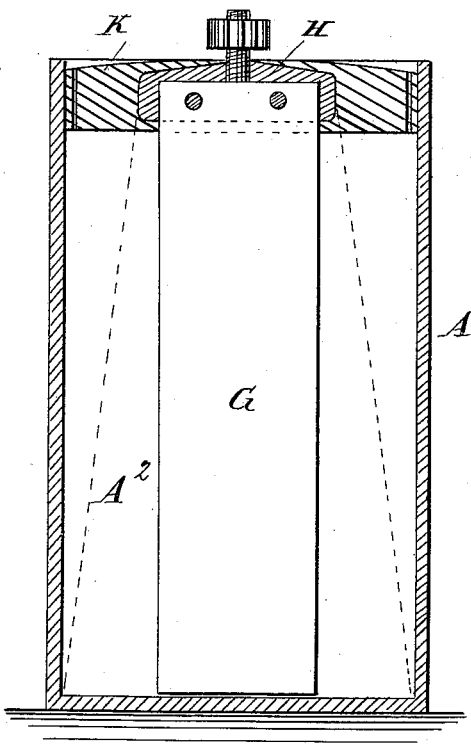

Figure 1 is a plan view of my improvement. Fig. 2 is a sectional plan view of the same on the line $z\,z$ of Fig. 3. Fig. 3 is a sectional elevation of the same on the line $x\,x$ of Fig. 1, and Fig. 4 is a similar view of the same on the line $y\,y$ of Fig. 2.

The cell A—of convenient shape and suitable material, such as hard rubber, glass, &c.—is provided at its upper end with part of a cover, B, permanently fixed to the cell and preferably of the same material. In the cover B is formed an aperture, C, through which passes the positive electrode D, held at its lower end in a recess, E, formed in the bottom of the cell A, so as to prevent sidewise motion of the electrode. The positive electrode is thus firmly held in place in the cell A, and is provided on its upper end, which extends a short distance above the cover B, with the usual binding-post.

In the cell A is placed in an inclined position the plate F, which is wider at the bottom than at the top, which latter fits snugly under or against the free end of the cover B. The plate F rests with its side edges on two adjoining sides of the cell, and thus forms two compartments, A' and $A^2$, in the cell A. The compartment A' is closed on top by the cover B, and in it is held the positive electrode D, and it also contains the exciting-liquid used in connection with the battery.

In the compartment $A^2$ is placed the negative electrode G, provided on its upper end with the usual head, H, from which projects the binding-post I. The head H is below the upper edge of the cell A, so that only the binding-post I projects above the cell A. The compartment $A^2$ is filled with electro-negative material J, which is packed upon the inclined plate F and around the negative electrode G. The electro-negative material extends to within a short distance of the lower end of the head H, and upon the top of the electro-negative material J is placed the cover K, of wax, cement, or other suitable material, so that the head H of the electrode G is completely embedded in the cover K.

The plate F is inclined, so as to form sufficient room in the upper part of the compartment $A^2$ for the head H of the electrode G, and also for conveniently packing the electro-negative material in the space $A^2$ around the electrode G. The inclined plate F may be of a porous carbon or other suitable material. It will be seen that only the binding-post of the electrode G projects above the upper end of the cell A.

In batteries as now constructed the head or cap surrounding the upper end of the negative electrode is raised above the top of the cell and covered with a coating of wax or cement to preserve it from the action of the atmosphere and attack of the salts of the battery. It is liable to be broken during transportation and to have its coating chipped off, thus seriously injuring the battery. In order to obviate this difficulty I embed the cap or head of the carbon electrode in the cement cover which seals the cell, entirely surrounding said cap with the cement and leaving the binding-post above the top of the cell.

It will further be seen that the cement cover to my cell is so formed as to be higher in the center around the electrode G than on any other part of its surface, causing any liquid that may be spilled on the said cover to run off and escape over the side of the jar or through the vent-holes, thus preventing the accumulation of salts in the cover.

The inclined plate F is firmly held in its position by its upper edge resting under or against the free end of the cover B and by the electro-negative material pressing with its own weight against the inclined plate. By the construction described I provide a very effective and convenient battery, and one which is especially adapted for medical and other uses where a large number of small cells is required.

Having thus fully described my invention, I claim as new and desire to secure by Letters Patent—

1. In a galvanic battery, a cell having a part cover permanently secured to the cell and provided with an aperture for the passage of the positive electrode, substantially as shown and described.

2. In a galvanic battery, the combination, with the cell, of a division-plate placed in an inclined position and dividing the cell into two compartments, of which one is larger at its upper end to form sufficient space for the head of the negative electrode and for conveniently packing the negative material around the negative electrode, substantially as shown and described.

3. In a galvanic battery, the combination, with the negative electrode and its head, of a sealing-cover held in the upper part of the jar and completely embedding the said head, which is thus protected from evil influences, substantially as set forth.

4. In a galvanic battery, the combination, with the cell and a part cover permanently secured to the upper end of the cell, of a division-plate held in an inclined position in the said cell and resting with its upper edge under or against the free end of the part cover, substantially as shown and described.

5. In a galvanic battery, the combination, with the cell provided with a part cover having an aperture for the passage of the positive electrode, of a division-plate held in an inclined position in the said cell and forming two compartments, one for the positive and one for the negative electrodes, the electro-negative material placed in one of the said compartments, the negative electrode provided with a head held below the upper edge of the cell, and a cover held on top of the electro-negative material and completely embedding the said head of the negative electrode, substantially as shown and described.

HORATIO J. BREWER.

Witnesses:
 THEO. G. HOSTER,
 C. SEDGWICK.